Patented Mar. 15, 1932

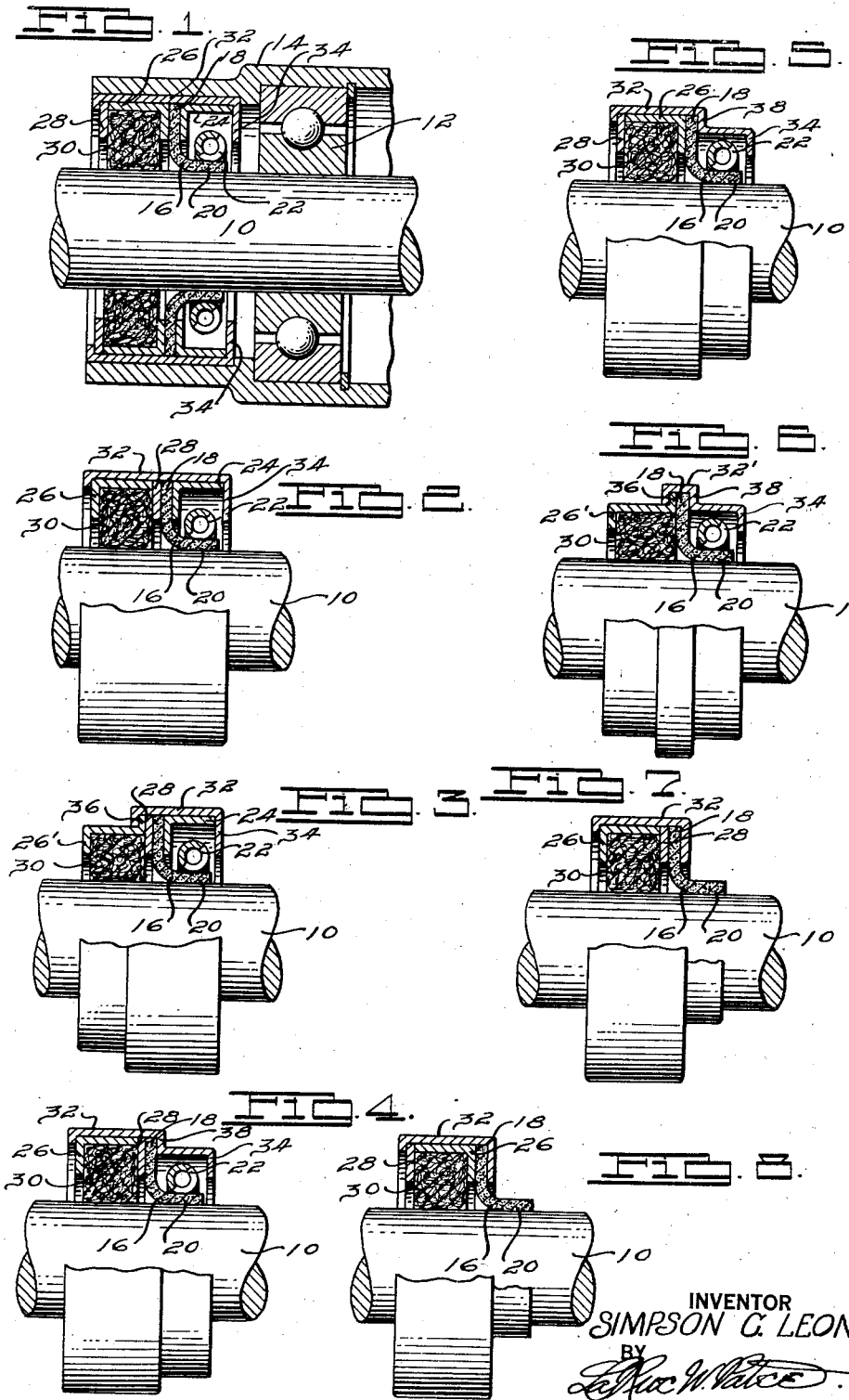

1,849,404

UNITED STATES PATENT OFFICE

SIMPSON C. LEONARD, JR., OF DETROIT, MICHIGAN

LUBRICANT SEAL

Application filed February 12, 1931. Serial No. 515,299.

This invention relates to a lubricant seal such as is adapted to be positioned within a tubular housing about a rotatable shaft for preventing grease, oil or other liquid from flowing between the shaft and the housing.

Heretofore it has been customary to provide a leather gasket having flanges and an axially extending flange which surrounds a rotatable shaft with a resilient member around the axially extending flange to press the latter into sealing engagement with the rotatable shaft. Such a construction, while it retains the lubricant within the housing, permits fine particles of dust or grit from the outside to be collected between the shaft and the leather packing. The leather packing being of a fairly solid material, retains the small particles of grit in contact with the shaft, thereby causing a wearing away of the shaft and consequently the lubricant will not be retained within the housing.

It is therefore an object of this invention to provide in combination with such a leather packing a felt or soft packing member arranged at the outer side of the leather packing around the rotatable shaft to prevent dirt from getting in contact with the leather packing. The dirt collected by the soft packing member does not wear the shaft because the packing is soft and the dirt is not held firmly against the shaft, but where dirt is collected on the leather packing it is held firmly against the shaft and causes the shaft to wear.

It is another object of this invention to arrange such packing members in an annular casing. Both packing members are held in proper position relative to each other, the entire construction constituting a single unit which may be easily applied to a shaft within a housing.

Further objects and advantages of the invention will more fully appear from the following description taken in connection with the accompanying drawings, in which:

Fig. 1 is a sectional view of my improved sealing unit as applied within a tubular housing around a rotatable shaft.

Figs. 2 to 8, inclusive, are sectional views corresponding to Fig. 1, each showing a modified form of my invention and a different arrangement of the parts.

Referring to the drawings, particularly to Fig. 1, I have shown a shaft 10 journaled in bearings 12 mounted in a tubular housing member 14. A leather washer 16 is formed angular in cross section and has an annular flange 18 extending radially from the shaft and an annular flange 20 extending axially of the shaft. The flange 20 is extended inwardly, having a resilient member 22 in the form of an annular coil spring around the outer periphery of the flange 20. The resilient member 22 urges the flange radially inward into sealing engagement with the shaft 10.

The leather packing is held in position by the flange 18 being positioned between oppositely disposed annular ring like members 24 and 26, which are angular shape in cross section. A flat annular member 28 abutting against the outer end of the member 26 and a soft packing member 30, preferably felt, is held in the space between the member 28 and the radially extending flange of the member 26.

An outer casing 32 is provided with a cylindrical portion and a radially extending flange 34 in the inner end of the casing. The inner flange of the member 24 bears against the flange 34. The resilient member 22 is received in the space formed between the flange 34 and flange 18 of the gasket 16.

In assembling the lubricant sealing unit, the member 24 is placed in the casing 32, the leather gasket 16 is placed in the casing with the resilient member around the flange 20 and the flange 18 against the radially extending flange of the member 24. The member 26 is then inserted and the soft packing member 30 is placed in the member 26. The washer 28 is received against the outer end of the member 26, and finally the outer end of the cylindrical portion of the member 32 is bent inwardly over the outer periphery of the washer 28, pressing the members 28, 26, 30, 18 and 24 inwardly, thereby pinching the flange 18 between the members 24 and 26.

It will be understood that the parts are held firmly against relative rotation with the casing and that the assembly forms a compact unit with the soft packing member in its proper position relative to the leather packing.

If desired, the washer 28 may be inserted against the flange 18 of the leather packing and the soft packing and member 26 finally inserted, the member 26 being turned around with its radial flange at the outer end This is shown in Fig. 2.

When it is desired to reduce the bearing length of the casing 32, a radially extending flange 36 may be formed on the angularly shaped member 26' and the outer end of the casing 32' may be turned over the outer edge as shown in Fig. 3, or the bearing length of the sleeve may be reduced from the inner end and the member 24 omitted, as shown in Figs. 4 and 5. The parts 26 and 28 may be reversed, as shown in these two figures. There is an annular depressed portion at the inner end of the seal forming a shoulder 38 against which the flange 18 of the leather packing abuts.

For the manufacture of a less expensive seal, the washer 28 and the angle member 24 may be omitted, as shown in Fig. 6. In this form of my invention, the member 26' having a flange 36, as shown in Fig. 3, may be used and a shoulder 38 is formed in the casing 32'.

As shown in Figs. 7 and 8, the resilient member 22 may be omitted, as well as the member 24. In these forms the radially extending flange 34 on the casing 32 forms the abutment for the flange 18 of the leather packing member. The member 26 and washer 28 may be in the position shown in Fig. 7 or they may be reversed as shown in Fig. 8.

Thus it will be understood that various changes, including the size, shape and arrangement of parts, may be made without departing from the spirit of my invention and it is my intention to cover by the appended claim such changes as may be reasonably included within the scope thereof.

What I claim is:

A self-contained sealing unit comprising a cylindrical casing member having inwardly extending flanges at its opposite ends, a pair of annular angle members each having an outer axially extending flange and a radially extending flange, said axially extending flanges being arranged back to back, a leather packing having an axially extending flange and a radially extending flange, said radially extending flange being between the radially extending flanges of said angle members, said axially extending flange of the leather packing extending in the same direction of one of the axially extending flanges of one angle member, and a soft packing adjacent the radially extending flange of the leather packing on the side opposite to the direction of the axially extending flange of the leather packing.

SIMPSON C. LEONARD, Jr.